United States Patent [19]

Warren

[11] Patent Number: 4,777,787
[45] Date of Patent: Oct. 18, 1988

[54] TREE SHAPING APPARATUS

[75] Inventor: Phillip M. Warren, Jacksonville, Tex.

[73] Assignee: Anjo Tree Shapers, Inc., Jacksonville, Tex.

[21] Appl. No.: 856,686

[22] Filed: Aug. 7, 1986

[51] Int. Cl.⁴ .......................................... A01O 55/18
[52] U.S. Cl. ...................... 56/235; 56/233; 47/4
[58] Field of Search ......... 56/237, 235, 15.2, 233–236, 56/255, 6; 47/4; 30/379, 299, 379.5; 83/928

[56] References Cited

U.S. PATENT DOCUMENTS

| 3,192,695 | 7/1965 | Leydig et al. | |
|---|---|---|---|
| 3,487,614 | 1/1970 | Uhor | 56/233 |
| 3,496,709 | 2/1970 | Egbert et al. | |
| 3,635,004 | 1/1972 | Webb et al. | |
| 3,685,264 | 8/1972 | Littan | 56/234 |
| 3,888,071 | 6/1975 | Wallace | |
| 4,383,401 | 5/1983 | Lessard et al. | |
| 4,455,815 | 6/1984 | Grant | 56/235 |
| 4,601,162 | 7/1986 | Wessel | 56/6 |

FOREIGN PATENT DOCUMENTS

| 2362540 | 6/1975 | Fed. Rep. of Germany | 56/236 |
|---|---|---|---|
| 2230285 | 12/1974 | France | 56/235 |

Primary Examiner—John Weiss
Attorney, Agent, or Firm—Jerry W. Mills; Alan Bruce Clay

[57] ABSTRACT

A tree shaping apparatus includes a mobile transport (10) with a cutter carriage (12) disposed in thereof. The transport (10) straddles the trees and the cutter carriage (12) has the height thereof adjusted to that of the tree. A cutter bar (90) is rotated about the tree with blades (92) providing the shaping therefor. The cutter bar (90) can be reciprocated laterally to provide an additional height adjustment.

9 Claims, 2 Drawing Sheets

TREE SHAPING APPARATUS

TECHNICAL FIELD OF THE INVENTION

The present invention pertains in general to an apparatus for shaping trees and, more particularly, to an apparatus for trimming Christmas trees in a conical shape.

BACKGROUND OF THE INVENTION

Christmas trees require a number of trimmings during their lifetime prior to being harvested for sale to the general public. Typically, they are trimmed a number of times per year. A number of devices have been developed for automatically shaping the trees. These are represented in U.S. Pat. No. 3,496,709, issued to L. E. Ebert on Feb. 24, 1970, U.S. Pat. No. 3,888,071, issued to L. E. Wallace on June 10, 1975 and U.S. Pat. No. 4,383,401, issued to K. R. Lessard, et al. on May 17, 1983.

The Ebert device illustrates a side mounted Christmas tree shaper which comprises a boom for holding a trimming apparatus. The trimming apparatus is comprised of a horizontal bar which is rotatable through 360°. The rotatable bar has a member reciprocated thereon and parallel to the ground. Attached to this member is a cutter mechanism which can be disposed at an angle with respect thereto. This cutter mechanism can be reciprocated along the horizontal plane of the rotating bar such that it defines a conical cutting surface coaxial with the rotating axis of the bar. This device has a disadvantage in that it is side mounted and must be attached to a vehicle that is of such dimensions to travel between rows of Christmas trees.

The Wallace device utilizes a rotating platform through which a cutter mechanism is disposed at a variable length downward therefrom. The platform is adjustable in height and is operable to straddle the Christmas tree.

The Lessard device discloses a rotating cutter which is mounted on a boom on the front of a tractor. The boom is swung out over the tree while the tractor or mobile platform moves between the rows. Once the boom is raised over the tree, it is necessary to level the cutting apparatus such that it defines a cone shape. This requires two hydraulic cylinders to adjust the level thereof to define the correct conical shape for the tree. A disadvantage to this device is lining up the cutting member with respect to the desired cone shape for the tree.

The above devices having a number of disadvantages in that the Lessard and Ebert device are side mounted and are difficult to align to provide the correct conical shape and the Wallace device is cumbersome in that it must raise the entire device above the level of the trees to provide the cutting operation. Therefore, in view of the above disadvantages, there is a need for an improved trimming apparatus.

SUMMARY OF THE INVENTION

The present invention disclosed and claimed herein comprises a transport for straddling a row of trees. The transport contains a shaper carriage which has a reciprocal horizontal support bar attached thereto. The support bar is reciprocal to provide varying heights and has attached thereto a rotating shaft. The rotating shaft has attached thereto a cutter bar which is rotatable about a conical path. The conical path is disposable over a tree and rotatable to shape the tree. The cutter bar extends downward from the rotating shaft at an angle with respect to the rotational axis thereof. In addition, the cutter bar moves perpendicular to the rotational axis intersecting the rotational axis at various positions therealong. This movement alters the apex of the conical path defined when the cutter bar is rotated with the rotating shaft.

In another embodiment of the present invention, the cutter bar has an extension provided therefor to extend the length of the cutter bar for facilitating larger trees.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
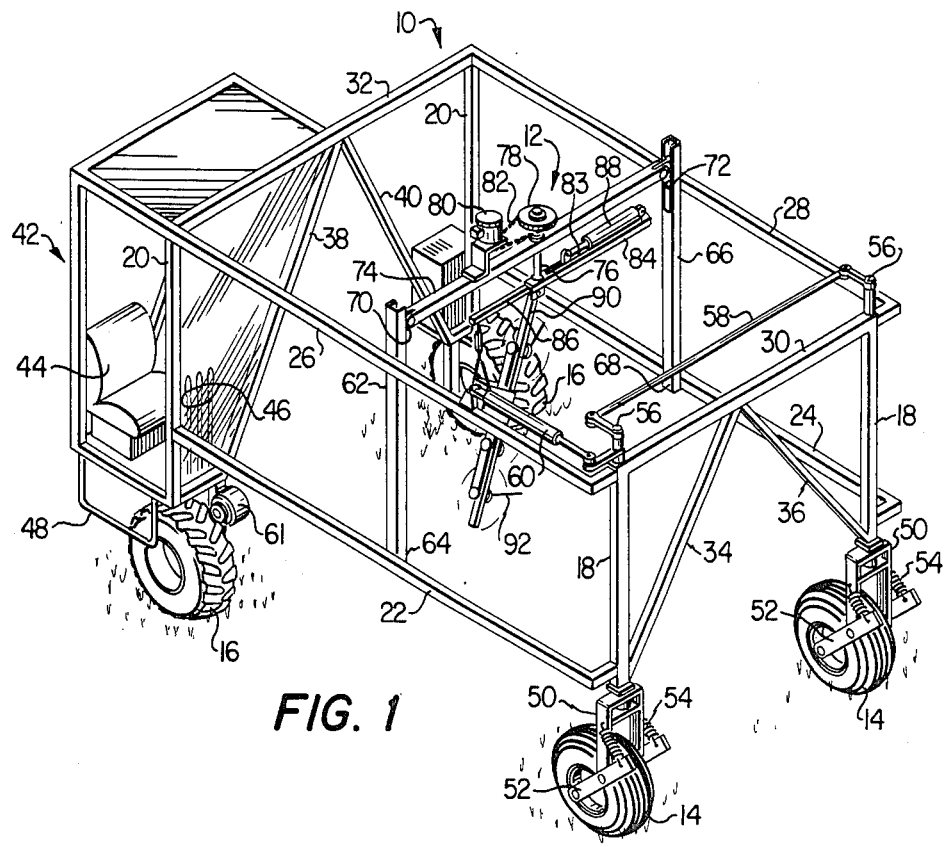
FIG. 1 illustrates a isometric view of the tree shaper apparatus of the present invention.

Referring now to FIG. 1, there is illustrated an isometric view of the tree shaping apparatus of the present invention. The apparatus includes a mobile transport 10 which carries a height adjustable shaping carriage 12. The transport 10 is comprised of two front wheels 14 for providing a steering capability and two driven wheels 16 for providing mobility. Two upright supports 18 are provided, one each associated with each of the front wheels 14. Two rear upright supports 20 are provided, one each associated with each of the rear wheels 16. A lower horizontal bracket 22 is provided on the right side of the mobile transport 10 attached between upright supports 18 and 20 and a lower horizontal support 24 is provided on the left side between upright supports 18 and 20. An upper horizontal bracket 26 is disposed between the upright supports 18 and 20 on the left side and an upper horizontal bracket 28 is disposed between the upright supports 18 and 20 on the left side of the mobile transport 10.

A front upper crossbar 30 is provided on the upper end of the upright supports 18 on both the right and left side. A rear crossbar 32 is provided on the upper ends of the upright supports 20 on the left and righthand sides of the mobile transport 10. A support member 34 is disposed between the lower end of the upright support 18 on the righthand side and the middle of the cross member 30 and a support 36 is disposed between the lower end of the upright support 18 on the lefthand side thereof and the middle of the cross member 30. The supports 34 and 36 provide a clearance for Christmas trees when the front wheels 14 straddle a row of Christmas trees. In a similar manner, a support 38 is disposed between the lower end of the upright support 20 and the middle of the cross member 32 on the righthand side of the transport 10 and a support member 40 is disposed from the lower end of the upright support 20 and the middle of cross member 32 on the lefthand side to allow the tree to pass through the rear of the transport 10 as the transport 10 moves along a row of Christmas trees.

A drivers cage 42 is provided on the righthand side at the rear of the transport 10 and comprises a seat 44 and controls 46. The controls 46 are hydraulic controls. A step 48 is provided for assisting the operator in entering the drivers cage 42. The cage 42 is shaped such that the tree can easily pass between the rear wheels 16 and the two supports 38 and 40.

Each of the wheels 14 is disposed between a U-shaped bracket 50 with suspension members 52 disposed between the axle of the wheels 14 and the U-shaped bracket 50. The suspension members 52 are pivotally attached to the end of the U-shaped bracket 50 with springs 54 disposed between the upper end of the suspension member 52 and the U-shaped bracket 50 to provide some shock relief to the sytem.

The U-shape brackets 50 are pivotally attached to rods 56, the rods 56 being disposed through the center of upright supports 18. A steering linkage 58 is provided which is operated by a hydraulic cylinder 60 which provides steering for the wheels 14. Although not illustrated, the hydraulic cylinder 60 is interfaced with the controls 46 through appropriate hydraulic lines. Each of rear wheels 16 is driven by the hydraulic motor 61 which is controlled by the controls 46.

The shaping carriage 12 includes an upright track 62 on the righthand side of the mobile transport 10 and is pivotally attached to the horizontal bracket 22 at a pivot point 64. An upright support 66 is provided on the lefthand side of the mobile transport 10 and pivotally attached at the lower end thereof at a pivot point 68 to the horizontal bracket 24. Each of the tracks 62 and 66 has a telescoping member 70 and 72, respectively, for attachment to either end of a cross member 74. The upper telescoping ends 70 and 72 are operable to telescope upward to raise and lower the cross members 74.

A rotating shaft 76 is rotatably mounted in the center of the cross member 74 and driven by a pulley 78. A hydraulic motor 80 is provided for driving a belt 82 to drive the pulley 78 and rotate the shaft 76. A telescoping bar is attached to the shaft 76 and is comprised of an outer member 84 and an inner telescoping member 86. A hydraulic cylinder 88 is provided for telescoping the inner telescoping member 86 with respect to the outer member 84 through slot 83.

A cutter bar 90 is disposed at an angle with respect to the inner scoping member 86 and is secured thereto. Telescoping of the member 86 causes the cutter bar 90 to reciprocate back and forth along the longitudinal axis of the outer member 84. The cutter bar 90 has cutter blades 92 disposed along the surface thereof and directed inwardly toward the center of the shaping carriage 12.

Figure 2:
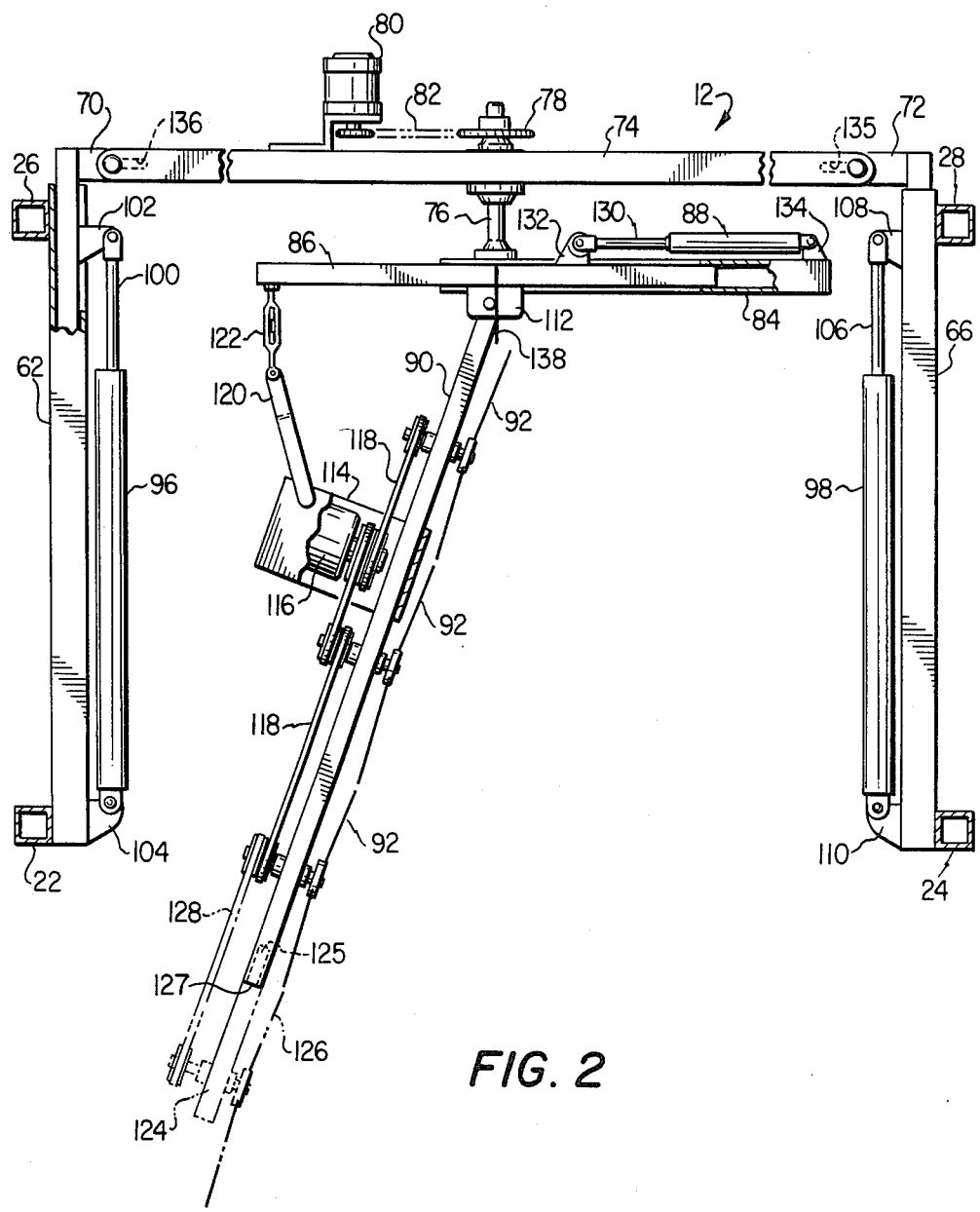
FIG. 2 illustrates a detailed view of the cutting carriage.

Referring now to FIG. 2, there is illustrated a detailed view of the shaping carriage 12, wherein like numerals refer to like parts in the various Figures. The upper portion 70 of the track 62 is reciprocated by a hydraulic cylinder 96 and the upper portion 72 of the track 66 is reciprocated by a hydraulic cylinder 98. The cylinder 96 has a piston 100 which is pivotally attached to a bracket 102 on the upper portions 70 and the opposite end of the cylinder 96 is pivotally connected to a bracket 104 on the lower end of track 62. Hydraulic cylinder 98 has a piston 106 with the upper end thereof pivotally attached to a bracket 108 attached to the upper portion 72. The opposite end of the hydraulic cylinder 98 is pivotally attached to a bracket 110 on the lower end of track 66.

The cutter bar 90 is pivotally attached to a bracket 112 on the upper end thereof, the bracket 112 being integral with the inner telescoping portion 86 which telescopes inside the outer telescoping portion 84.

Although not shown, it is to be understood that outer portion 84 has a slot in it so that bracket 112 may be attached directly to the inner portion 86, and thus bracket 112 may move with portion 86. A housing 114 is physically connected to the cutter bar 90 and is operable to secure a hydraulic motor 116. The motor 116 is interfaced with the blades 92 through various belts 118.

The housing 114 is supported from the outer end of the inner telescoping member 86 with a bracket 120 and turnbuckle 122. The bracket 120 and the turn buckle 122 determine the angle the cutter bar 90 makes with the rotating axis of the shaft 76.

In order to extend the length of the cutter bar 90, an additional section 124 illustrated in phantom lines can be attached to the end of cutter bar 90. An additional section 124 has a blade 126 operable to be attached thereto and interfaced with belts 118 and pulley mechanisms through a belt and pulley mechanism 128

The section 128 has a reduced sized end 125 which fits into the hollow end 127 of the bar 90. The section 128 can be interference fitted into bar 90 and held in place in conjunction with the belt 128, or it may be securd by any appropriate method such as bolts or pins (not shown).

The hydraulic cylinder 88 has a piston end 130 which is pivotally connected at the end thereof to a bracket 132, the bracket being integrally attached to the inner telescoping portion 86.

Outer portion 84 has a slot that allows bracket 132 to be attached to and cause inner portion 86 to move. The opposite end of the cylinder 88 is pivotally connected to a bracket 134, the bracket 134 being integrally attached to the end of the outer telescoping portion 84.

In operation, the hydraulic cylinder 88 is controlled to define the intersection of the rotational axis of the shaft 76 with the cutter bar 90. This intersection point defines the top of the conical cutting surface defined by the blades. The shaft 76 is then controlled by motor 80 to traverse an angle slightly greater than 360°. Although not illustrated, the hydraulic motor 116 and the hydraulic cylinder 88 have hydraulic hoses interfaced therewith to limit overall motion. Therefore, one cutting path would constitute 360°in one direction and then the cutter bar 90 would have to be returned in the opposite direction in a subsequent cutting operation to prevent tangling of the hydraulic lines.

To facilitate relative movement of the cross member 74 and the bracket 62 and 66, the ends of the cross member 74 are slotted. A slot 135 on one end of the cross member 74 is pivotally interfaced with the upper portion 72. A slot 136 on the opposite end of the cross member 74 is pivotally interfaced with the upper portion 70. The slots 135 and 136 allow the upper portions 70 and 72 to be reciprocated at different levels to "tilt" the cross member 74 for operation on hills, as will be described hereinbelow.

Figure 3:
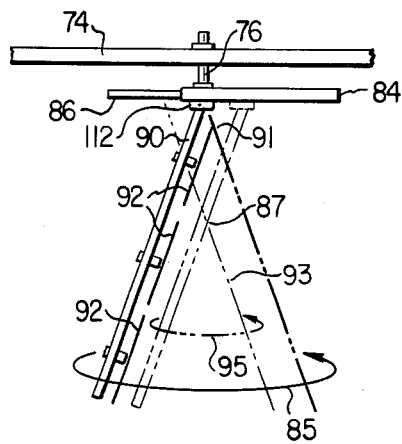
FIG. 3 illustrates an operational view of the cutting carriage showing two different levels of cutting.

Referring now to FIG. 3, there is illustrated a simplified diagram of the operation of the cutting operation, wherein like numerals refer to like parts in the various Figures. In operation, the cross bar 74 is set to a predetermined height above ground. In one position, illustrated in the solid lines, the inner member 86 of the telescoping member is reciprocated outward to place bracket 112 directly below shaft 76 to provide maximum cutting height. The rotating shaft 76 is then rotated as illustrated by arrow 85 to shape the tree. If it is desirable to go from one height to another lower height with the cross bar 74 disposed in the same position, it is only necessary to telescope the inner member 86 inward to the outer member 84 as shown by the position in phantom lines. This causes the cutter bar 90 to intersect the rotational axis of the bar 90 at a point 87 lower than the previous point 91. Phantom line 93 represents the position of the bar 90 when rotated 180° by the turning of the shaft 76. This cutting position is illustrated by the arrow 95. The apex of the curvature to be cut is thus lowered allowing shorter trees to be shaped.

If it is desirable to cut a larger tree, it is only necessary to raise the cutter bar 90, the cross member 74 higher. However, there is only approximately one foot to one and one half feet between the bottom limbs of the tree and the ground. Therefore, for a given length of the cutter bar 90, the cross member 74 can only be raised approximately one to one and one half feet from its lowest position. In order to increase the size of the tree which can be cut, the additional section 124, illustrated in FIG. 2, is added to increase the length of the cutter bar when a taller tree is to be trimmed. The additional blade 126 is then added and a cutting operation continued.

In operation, the cutting apparatus is generally set for one size of tree and then a row of trees worked on. Normally, Christmas trees are grouped in age such that all trees in a particular group on a given number of acres is planted at the same time. The trees only have to be shaped a couple of times during their lifetime before being cut. Therefore, one setting of the apparatus allows a large number of trees to be shaped.

Figure 4:
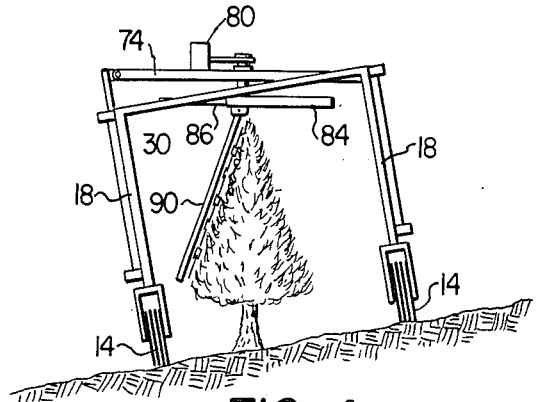
FIG. 4 illustrates a simplified view of the cutting device on an incline.

Referring now to FIG. 4, there is illustrated a detailed view of the tilting operation of the cross member 74 for cutting trees on a slight incline. To accommodate this incline, one of the tracks 62 or 66 is reciprocated upward to maintain cross member 74 level with the ground. This allows trees on an incline to be shaped with one setting for the incline.

In order to align the shaping carriage 12 with the tree, an alignment wire 138 is illustrated in FIG. 2 as being attached to the outer telescoping portion 84 and extending downward along the rotational axis of the shaft 76. This wire 138 allows the operator to sight along the row of tree tops to determine if the apex of the tree is properly aligned with the rotational axis of the shaping carriage 12. In addition, the inner section of the support members 34 and 36 conform to an inverted V-shape which allows the tree to pass therethrough. By aligning the transport 10 in such a manner that the tree passes directly through the two supports 34 and 36 in the proper manner with both sides being symmetrical with respect thereto, the transport 10 can be aligned along the row. Even if the tree is taller than the apex formed by the supports 34 and 36, the tree will bend and pass under the upper bar 30 to allow it to be shaped by the cutter bar 90.

In summary, there has been provided a tree shaping apparatus which comprises a transport for straddling the trees with a shaping carriage disposed thereon. The shaping carriage has a rotating cutter bar attached thereto with an adjustable height. The cutting bar also can be moved laterally such that the height of the trees to be cut can be adjusted without raising the height of the carriage.

Although the preferred embodiment has been described in detail, it should be understood that various changes, substitutions and alterations can be made therein without departing from the spirit and scope of the invenntion as defined by the appended claims.

I claim:

1. A tree shaper for operation on an uneven terrain, comprising:
    transport means for traversing a row of trees and straddling the trees;
    a horizontal bar having first and second ends generally disposed over the trees and perpendicular to the path of travel of said transport means;
    carriage means attached to said transport means for supporting said horizontal bar at said first and second ends over said trees and operable to selectively raise the height of either end of said bar relative to said transport means;
    means for controlling said carriage means to selectively adjust the height of either said first or second ends of said bar to adjust the angle of said bar with respect to the trees straddled by said transport means such that said bar remains level regardless of the grade of the terrain;
    a cutter bar pivotally disposed adjacent said horizontal bar and disposed at an angle downward therefrom such that said cutter bar can be disposed adjacent the side of a tree and at one angle with respect to the vertical axis of the tree;
    cutting means disposed along the length of said cutter bar and operable to cut all material on the tree adjacent to said cutter bar;
    means for pivoting said cutter bar to traverse a conical path, said conical path having an apex; and
    means for raising and lowering said apex of said conical path relative to said horizontal bar.

2. The apparatus of claim 1 and further comprising means for increasing the length of said cutter bar and said cutting means such that the length of the cutting path of said cutting means and said cutter bar is increased.

3. The tree shaper of claim 1 wherein said transport means comprises:
    first and second longitudinal bar for being disposed parallel to the path traversed by said transport means;
    first and second wheels connected to each of said longitudinal bars at either end thereof for supporting said longitudinal bars above said ground;
    steering means for steering one of the wheels on each of said first and second longitudinal bars;
    motive means for providing a motive force on at least one of the wheels on at least one of said first and second longitudinal bars;
    upper platform means for providing an upper surface to straddle the trees and having two sides;
    first vertical support means disposed between said longitudinal bar and said upper platform means for providing support for one side of said upper platform means; and
    second vertical support means for being disposed between said second longitudinal bar and the other side of said upper platform means to provide support for the other side of said upper platform means;
    said carriage means attached to said first and second longitudinal bars and operable to straddle the trees.

4. The apparatus of claim 3 and further comprising:

operator location means for allowing an operator to be seated on said transport means to operate said steering and motive means and to operate said cutter means and said carriage means; and sight means disposed between said operator location means and said transport means to allow an operator disposed in said operator location means to sight along said sight means and along the row of trees such that the apex of one trees in the row of trees can be placed proximate the apex of said conical path formed by said cutter bar and said cutter means.

5. The tree shaper of claim 1 wherein said cutter means comprises a plurality of individual primary rotating blades rotating in a plane parallel to the longitudinal axis of said cutter bar and parallel to the side of the tree when said cutter bar is disposed adjacent a tree, and primary means for rotating said blades.

6. The apparatus of claim 5 and further comprising:

an extension for being disposed on the lower end of said cutter bar to increase the length of said cutter bar;

an additional rotating blade disposed on said extension; and means for rotating said additional blade in conjunction with rotation of said primary blades such that the length of the tree on the side thereof of said conical path is increased without raising or lowering the apex of said conical path relative to the ground.

7. The tree shaper of claim 1 wherein said pivoting means for pivoting said cutter bar is operable to pivot approximately 360° in one direction for one tree and on a subsequent tree in the row of trees to pivot in the opposite direction 360° such that for each subsequent tree in the row of trees the direction of pivoting changes, the starting and ending position of said cutter bar in said conical path perpendicular to the path of travel such that a tree can pass under said transport means without being impeded by said cutter bar and said cutting means.

8. The tree shaper of claim 1 wherein said means for moving the upper end of said cutter bar comprises a telescoping arm having one end thereof secured to said pivoting means and the other end operable to reciprocate with respect to said first end, said cutter bar attached to the other end of said telescoping arm.

9. The tree shaper of claim 1 wherein said means for controlling said carriage means to adjust the height of said bar comprises a first cylinder and associated reciprocating piston for reciprocating therein disposed on one side of said transport means between said transport means and said carriage means and a second cylinder and associated reciprocating piston being disposed between said transport means and said carriage means on the side of said transport means and said carriage means diametrically opposite said first cylinder and associated piston; and control means for inividually controlling said first and second cylinder and associated reciprocating pistons such that diametrically opposite sides of said carriage means can be separately controlled to control the angle that said horizontal bar makes with respect to said trees and the ground over which said transport means traverses.

* * * * *